US008550358B2

(12) United States Patent
Perez (10) Patent No.: US 8,550,358 B2
(45) Date of Patent: Oct. 8, 2013

(54) PROCEDURE FOR DATA ENCODING AND READING STARTING FROM INTERFERENCE OF WAVE PATTERNS GENERATED IN A PRINTED CHROMATIC SYSTEM

(76) Inventor: Agustin Jose Luis Perez, Buenos Aires (AR)

(*) Notice: Subject to any disclaimer, the term of this patent is extended or adjusted under 35 U.S.C. 154(b) by 382 days.

(21) Appl. No.: 12/788,415

(22) Filed: May 27, 2010

(65) Prior Publication Data

US 2010/0288840 A1  Nov. 18, 2010

Related U.S. Application Data

(63) Continuation-in-part of application No. 11/749,324, filed on May 16, 2007.

(30) Foreign Application Priority Data

May 31, 2006  (AR) .............................. 2006 0102275

(51) Int. Cl.
*G06K 13/107*  (2006.01)

(52) U.S. Cl.
USPC ........................................................ 235/487

(58) Field of Classification Search
USPC ........................................................ 235/487
See application file for complete search history.

(56) References Cited

U.S. PATENT DOCUMENTS

| | | | |
|---|---|---|---|
| 5,522,623 A | 6/1996 | Soules et al. | |
| 2002/0057852 A1 | 5/2002 | Durbin et al. | |
| 2005/0067489 A1 | 3/2005 | Jones et al. | |
| 2005/0279248 A1* | 12/2005 | Auslander | 106/31.28 |
| 2010/0208955 A1* | 8/2010 | Mehes et al. | 382/128 |

FOREIGN PATENT DOCUMENTS

| | | |
|---|---|---|
| EP | 1 457 916 A | 9/2004 |
| GB | 1 371 254 A | 10/1974 |
| GB | 1 424 442 A | 2/1976 |
| GB | 1 534 403 A | 12/1978 |
| GB | 2 272 861 A | 6/1994 |
| GB | 2 372 232 A | 8/2002 |
| WO | 90/00980 A | 2/1990 |
| WO | 02/070279 A | 9/2002 |
| WO | 2005/035271 A | 4/2005 |

* cited by examiner

*Primary Examiner* — Allyson Trail
(74) *Attorney, Agent, or Firm* — Ladas & Parry LLP (57) ABSTRACT

A method for identifying counterfeit cards and supports that can be used in such method. Such supports may be made of materials such as paper, cardboard, plastics and others. The creation of interference wave patterns generated starting from the interaction between an electromagnetic emitting source and particles installed in the cards or support, for example: by a printing processes. The so produced particle interactions (involving photons and electrons) provides complex interference maps in which constituent variables define wave junction conditions characteristic of the interaction between each INFORMATION BLOCK of particles. The BLOCKS are created/built in accordance to those variables' statements, and located at different points in the support. To be approved as a valid Data point, the wave function present at each of these Points should match those stored in an extremely complex Data Matrix.

20 Claims, 5 Drawing Sheets

FIG 2

Cyan

Magenta

Yellow

Black

PROCEDURE FOR DATA ENCODING AND READING STARTING FROM INTERFERENCE OF WAVE PATTERNS GENERATED IN A PRINTED CHROMATIC SYSTEM

RELATED APPLICATIONS

This application is a continuation-in-part of application Ser. No. 11/749,324, filed on May 16, 2007, the contents of which are incorporated herein by reference.

FIELD OF INVENTION

The invention consists of a codification procedure and the electronic reading of data to be applied onto supports for a variety of formats, for example: security cards, forms, tickets, etc., made of different materials such as: paper, plastics, cardboard, etc.

BACKGROUND OF THE INVENTION

Nowadays there is a large variety of technological developments oriented to providing security for the recognition of the authenticity of products, credential, and other kind of documents, and also meant for the prevention of the unauthorized reproduction of the data stored onto them. None of the available products provides a level of security reliable enough to avoid the ever increasing identity theft activities that are a result of the vulnerability of the available technologies. Among them, as a mode of example, we can mention the following:

1. Magnetic-Strip:

A widely spread technology, but with important security weaknesses resulting from the easy downloading of its information and the cloning by card-to-card copying practices.

2. Radio Frequency Identification Chip (RFID):

This technique was introduced into the market as a technology for the replacement of the magnetic-strip in applications such as credit cards, ID cards, etc. However, RFID is extremely easy to copy and it also has the strong disadvantage that it can be read from certain distances without the knowledge of the owner. On the Web, there is abundant information and research available on the weaknesses and vulnerabilities of this technology provided by universities, technicians and independent researchers, as well as damified users themselves.

3. Microchip:

It was initially conceived to store great amounts of information and not meant to provide security against access or copying. Its introduction to the Security Market occurred at a time when both the access and storage capacity of the Data Bases was limited, justifying the recording of all data onto the support-card. Nowadays, Data Bases offer huge possibilities and the trend has been reversed, focusing not on saving all the information onto the support, but looking for the most secure "access key" capable of opening files and registry located in remote Data Bases. Because the RFID's security barrier consists of encrypted mathematical algorithms that can be easily cracked or hacked, the vulnerability of this technology remains high.

4. Surface Scanners:

This technology operates by the laser scanning of a surface to be identified, recording the tracking points (traces), and then comparing them to a given pattern for positive identification. This procedure does not allow for the recording of any kind of codes, it merely recognizes whether the scanned surface is the same as the one stored on the registry. This has many operational and technological disadvantages due to:

A large amount of information (tracking points) is required to avoid the "repetition" of patterns between different supports, and produce positive identifications.

Some kinds of surfaces (for example, plastics) can be worn out or permanently modified by its normal and regular use, resulting in the continuous and uncontrolled modification of the surface-support.

It does not allow for the assignment of data or the recording of controlled information.

Among specific prior art disclosures in which identity information is concealed from the naked eye is that disclosed in U.S. Pat. No. 5,522,623 (Soules) which describes a card in which coding indicia are included on a layer of a laminate which is concealed from human view and the indicia are read by use of a conventional electro optic reader using a beam of light at a wavelength absorbed by the material in which the coded indicia are present but reflected by the background used. PCT publication WO90/00980 (Elba Holding BV) describes a laminated identification document in which some marks are invisibly coded but fluoresce under ultraviolet radiation. PCT Publication WO 2005/035271 (Gieske & Devrient GMBH) describes a coding system in which luminescent substances are associated with each other where the emission spectra of the two substances overlap in at least one partial area of the known emission range so that the spectrum of the one completes that of the other. PCT Publication WO 02/070279 (Gieske & Devrient GMBH) describes an authenticity feature for valuable documents using a doped matrix-lattice based luminescent substance wherein the doped lattice has a strong crystal field and is doped with at least one chromophore of electron configuration $(3d)^2$. British Patent Publication 1,424.442 (Transaction Technology Inc.) describes a coded identity card having plastic layers in which there are coded areas between the inner surfaces of layers wherein the coding is read by passing radian energy of a given frequency and sufficient intensity through the card. British patent Publication 2,372,232 (De La Rue International Limited) describes a security card with luminescent material exhibiting fluorescent, phosphorescent or anti-Stokes properties on one or more polymer layers.

In my earlier application Ser. No. 11/749,324, I described a security system which utilizes the change in waveform of electromagnetic radiation as it interacts with material having chromatic properties.

The present invention, contrary to the current technology, provides a high degree of security in terms of preventing data to be cloned. This is possible because the information is not produced by the administration of chemical products or inks (which could be found in the market) neither by use of a reading technique—as could be the wavelength matching to some inks or pigments (which could be reproduced simply sweeping in a search all along the frequency spectrum), but configuring a DATA STRUCTURE located onto blocks—monolithic units—susceptible of producing specific information (in the form of interference patterns) when bombarded by a beam of electromagnetic radiation. These STRUCTURES will inevitably be destroyed by any attempt to access the data, and in this way the information obtainable from them will be lost. It is also impossible to access the information via scanning procedures without the prior knowledge of the very complex parameters involved in the reading procedure because of the very linked status between the complex results (the interference patterns "drawn" at the output) and the input conditions (the bombarding source). In other terms: Any arbitrary result could be obtained from bombarding the DATA BLOCKS randomly, and thereof, for there is only a single and expected result to match for each point of the block measured (sample points) at a given time of a sequence (changing wave form of the source), there is no way to get all the billions of variables right, and then perform a reverse engineering practice. The complex parameters required to do so are stored on chips located in the reader devices and protected by sophisticated mechanisms (electronic traps) that burn them, or in some cases volatilize the settings and matrices they store upon any unauthorized attempt to gain access to their memories.

SUMMARY OF INVENTION

According to the present invention, data are stored in clusters of chromatic particles located on or in a medium which when bombarded by appropriate radiation will receive and radiate forth (propagation) a set of waves which superposition result in a new and complex wave pattern (interference phenomenon) This involves collision processes wherein at subatomic scale—the photon scale, for instance—particles annihilate each other and create new ones modifying their initial behavior. At a larger atomic scale waves cross each other in either constructive or destructive interferences). Authentication of the very complex patterns so created can be effected by comparison with a pre-existing "map" containing the set of parameters with which the compared patterns should match. These maps (Master Patterns) are obtained by irradiating the medium bearing such clusters. Additionally, if desired, modifications of the radiation in the manner described in my earlier application Ser. No. 11/749,324 may be superimposed on the interference pattern to produce an even more complex pattern which would need to be reproduced by those seeking to counterfeit the data-bearing medium of the present invention.

The invention allows for the production of ID INFORMATION, with a very high degree of security, applicable to a diversity of supports (such as: paper, plastics (for example acetate or plexiglass), cardboard, rubber, fabric, glass, adhesive tape, etc. by suitable means, for example a printing processes or other means of application of pigmented particles, and their subsequent reading and assimilation into a variety of codes. Chromatic particles used in clusters may be selected based inherent properties in modifying electromagnetic radiation. For example particles of different colors such as cyan, magenta, yellow and black (CMYK) may be used. Furthermore the concentration of particles in a cluster may be adjusted to secure particular interference effects based on the magnitude of inter particle spacing. The method of the invention is effected by utilizing the interactions resulting from complex interference patterns introduced into an electromagnetic field (dynamic—with respect to time) conformed by sequentially modulated wave components.

In the process of the present invention electromagnetic radiation (typical in the visible range but also possibly in the ultraviolet, infra red, microwave or radio frequency regions of the spectrum) is directed from one or more sources onto a medium on or in which particles are arranged in blocks or data modules. As a result of the interaction with the particles, the wave form of the radiation is altered to create an interference pattern. The nature and arrangement of the particles in effect "chromatic filters", which are constituted by inks, paints, or any other type of colorants or pigments, that modify the wavelength received from each particle during the exposition to the sequenced electromagnetic emission. Each time that the arrangement conforming each sample of particles is bombarded, they respond in a specific way according to the chromatic filter that affects each one of them, in the same way as if they were bombarded by a beam focused specifically on the particle (with its own and distinct wavelength, which would be in practice impossible to do at such a space scale). In this way, each particle from a sample refracts or/and reflects the electromagnetic wave "filtered" with its own characteristics (those of wavelength, amplitude and phase) towards neighboring particles, which, at the same time, react in the same way, each one effectively becoming a new source of radiation, and giving place to a system or interference module characteristic of this particular sample. In this way, and taking into account that the wave function at a given point in space is the summation of all the wave functions acting at this point, sample points are created. These sample points are defined by the disturbance of the field in these areas (and they are, in effect, the result of the summation of all the disturbances at those points). Those sample points are measured and their constituent variables (phase, amplitude and wavelength) compared to authentic reference patterns to determine whether they correspond to pre-established values related to wave function conditions present at these points, according to a matrix or master pattern given to each block or sample. If the values analyzed match the assigned patterns of reference, then it is assumed that they represent 1 or 0 in the system's output.

This process allows for the construction of "information blocks" that are integrated like "bricks" into monolithic and interdependent structures, in which particle interactions take place (typically photons exchange) in the collision processes and into the environment of bombarding matter by means of a controlled electromagnetic emission to result in a characteristic interference pattern.

Each of these blocks receives a unique identity (ID) according to the composition and configuration of their constitutive chromatic units, this is to say, its own CMYK mix and its particular structural configuration (location of the samples and the distance between them, overlapping, etc) which logically affects the interference patterns created from the bombarding process. The variables intervening in the construction of the information are controlled through the administration of parameters of color, saturation, dpi (dots per inch), etc., during a "customized" printing process. In this way, what defines the identity, in the framework of the invention, is the particular field dynamic resulting from the interaction of interference patterns produced from each arrangement of reflecting and refracting particles acting as chromatic filters present within each block of information created, each one acting like a source itself, and apporting its own wave function to the whole system. This results in a specific interference pattern for each sample or block. The control in the process of assigning the variables intervening at the reading stage makes possible the encoding of data for its subsequent decoding and assimilation into an informatic language or characters code: decimal, hexadecimal, ASCII, etc.

Detection of the parameters of the modified waveform is effected in any convenient way, for example by use of transducers and photoelectric cells arranged in an array so as to detect variations in one or both of the amplitude, phase and wavelength of the radiation at each interference point elected (so called, in the framework of the invention, "sample points")

The detectors used to determine the authenticity of an interference pattern created by bombarding a carrier on or in which particles have been deposited according to the invention will depend upon the type of electromagnetic radiation employed. For radiation in the infra red and visible parts of the spectrum, photovoltaic, photoresitor photoconductive or light-sensitive semi conductor devices may be used. For radiation in the ultraviolet range, photodiodes and photocathodes may be used. For microwave detection, Schotkky barrier diodes or other known microwave sensors may be used. If radio frequency is used, any known radio frequency detector may be employed Whatever the detection device employed, however, the basic method of detection remains the same.

Figure 5:
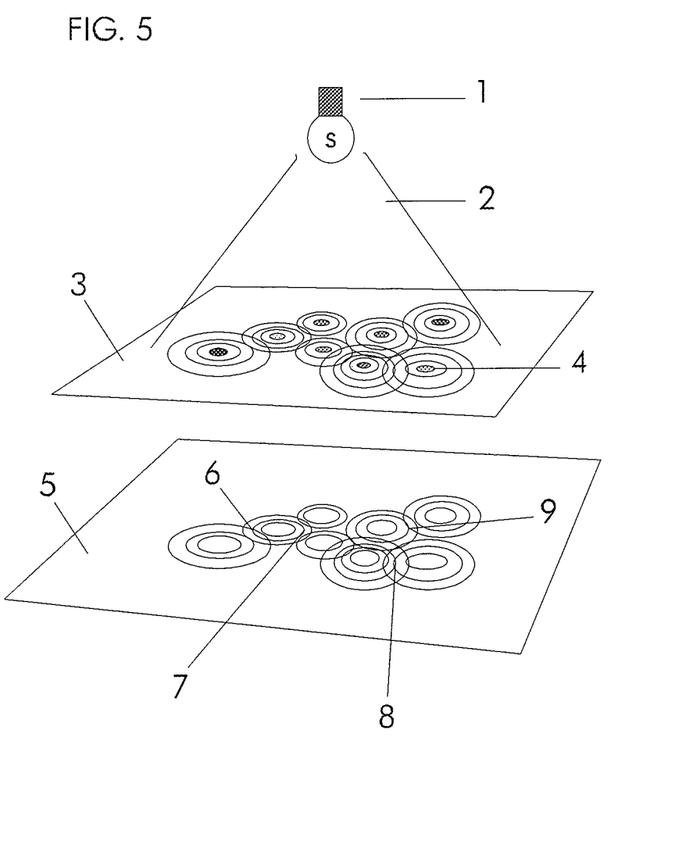

Although there are various techniques that can be implemented, for the effects of reading, we track the information from the sample points mainly by two different procedures:
1. Reflex Method:

Scanning the area of the measured field by radiating another (known) crossing field and then collecting the result by transceivers suitable to the wavelength of the radiation employed as discussed above (for example diodes or phototransistors arrays or single sequenced sets) into a "screen recipient" (as shown in FIG. 5) and from the information received, proceeding to analyse the recovered signal (by means of a software tool) clearing the original signal from it and so measuring the wave parameters at those points (amplitude, wavelength and phase). This technique implies overlapping a second INTERFERENCE process to scan the first one (the one which produces the original data.), reading both and subtracting the first in order to obtain a cleared signal.
2. Direct Method:

By the emission of radiation onto the sample points through the employment of two convergent beams of laser emitting-receiving diodes (may be adopted a "mirror system" to collect the information, or an all-in-one device combined trough lens with fototransistors—the type of those commonly used in CD readers—) focused on the SAMPLE POINTS, and their subsequent analysis for detecting the field disturbances on the measured points (again, by interference phenomena).

The difference between both techniques resides in the use of laser scanning and the ability it provides of focusing the beam into the sample points directly with no need of a reflection method. The choice of which method to use depends on cost or space conditions at the moment of production.

It should be noticed that there exist another possible actual or future methods for scanning signals that can be used to provide the same results if applied to the so constructed SAMPLE POINTS (according to the process of the invention and in order to capture the waves behavior aiming to provide the required SIGNAL ANALYSIS), and they don't affect anyway the essence of the invention itself since they are merely ways of approaching to the scanning, reading and analysing of signals.

As noted above, particle clusters may be applied to a carrier medium by printing techniques, that may also be injected into the body of a carrier medium or incorporated into a thermoplastic resin as the resin cools to solidify. Particles forming part of the clusters will typically have a size range of from 40 μm to 85 μm, although smaller and larger particles may be used if desired. Typically, a deposit of particles arranged into a distribution pattern according to produce a desired waves interference map (comprising pigment composition, interspacing and location of particles) will be applied in or on the carrier medium. Those deposits will provide typical wave behavior when bombarded by photons or other electromagnetic radiation from the emitting source and particle collision takes place. The so produced "typical behaviors" of the wave aspect of particle interactions, collected all along the READING process, will be as result of the specific conditions—or "form"—(wavelength, phase and amplitude) present in the bombarding beam (A), by the conditions that information encounters when colliding with the deposits' information (B), and so producing a typical result (C) as a consequence of the equality (identity) between two expressions (Ax+B=C). In this way, a different result will be obtained from altering A or B conditions, (for example altering the bombarding conditions).

Comparison with an authentic set of parameters that have been predetermined for a particular chromatic cluster may then be carried out by computer means, for example by use of a microprocessor. Therefore, the method of the invention acts as a SYSTEM, where there is an identity between data DATA CARRIED BY THE MEDIUM and the READING PROCESS ITSELF that should be satisfied to valid a sample. That sample could be an entire bit or part of one, according to the information design criteria adopted. Each bit may be into several parts, so the sum of various deposits' behavior will be required to validate one bit as a whole. When this is done, the "chromatic deposits" at the medium are split into separate parts. So that when verifying the authenticity of a bit, the system should validate 10 or 100 (or any other quantity) of "deposits's response" to accept that 1 bit is present at the output. Therefore 100 deposit units would need to be copied to obtain only 1 validated bit, in this way broading the security range of operation. Therefore, each part of them should match the MATRIX's variables, which represent interference conditions present at given points in the electromagnetic field (space). The MATRIX information is stored onto a chip (a volatile Read Only Memory memory—ROM—) whose information is kept available thanks to the energy provided by an internal battery, once the supply is broken (note: this action could be triggered by a bunch of events: for example by action of removing the reader from its work place, or broken the reader device anyway, or even opened) the memory is automatically deleted and the COMPARISON MATRIX lost. This protection mechanism is mounted so that the MATRIX values will keep on secret, and therefore reverse ingineering could not be practiced.

BRIEF DESCRIPTION OF THE DRAWINGS

The invention will hereafter be described with reference to the accompanying drawings, wherein like reference numerals denote like elements, and:

FIG. 1:

It shows in a simple way the basic schematic of the interference patterns on which the invention is based, starting from a photon emitting source and two receiving and emitting particles, each acting as a source that transforms (filter) and retransmits the signal, creating intersections (points in space) with particular wave functions.

FIG. 2:

It shows details of a BLOCK or INFORMATION MODULE integrated by an arrangement of particles chromatically treated and disposed in accordance to specific spatial parameters of concentration and distribution. This figure shows the block before being excited by an electromagnetic field.

FIG. 3:

It shows the same BLOCK or INFORMATION MODULE specified in FIG. 2, but this time exhibiting an assorted quantity of interference patterns resulting from the interactions (photon exchanges) that occur at the particle level generating diversified wave functions into diverse space points in between the particles.

FIG. 4:

A detail that shows how the BLOCKS are grouped on a support surface to form more complex information packages (bytes, etc).

FIG. 5:

Schematic showing the incidence of an electromagnetic light source upon a codified substrate by the invention's procedure, and at the same time, the information that constitutes the field disturbances projected on an "electric screen" for its ulterior reading and matrix comparison.

DETAILED DESCRIPTION OF THE PREFERRED EMBODIMENTS

Figure 1:
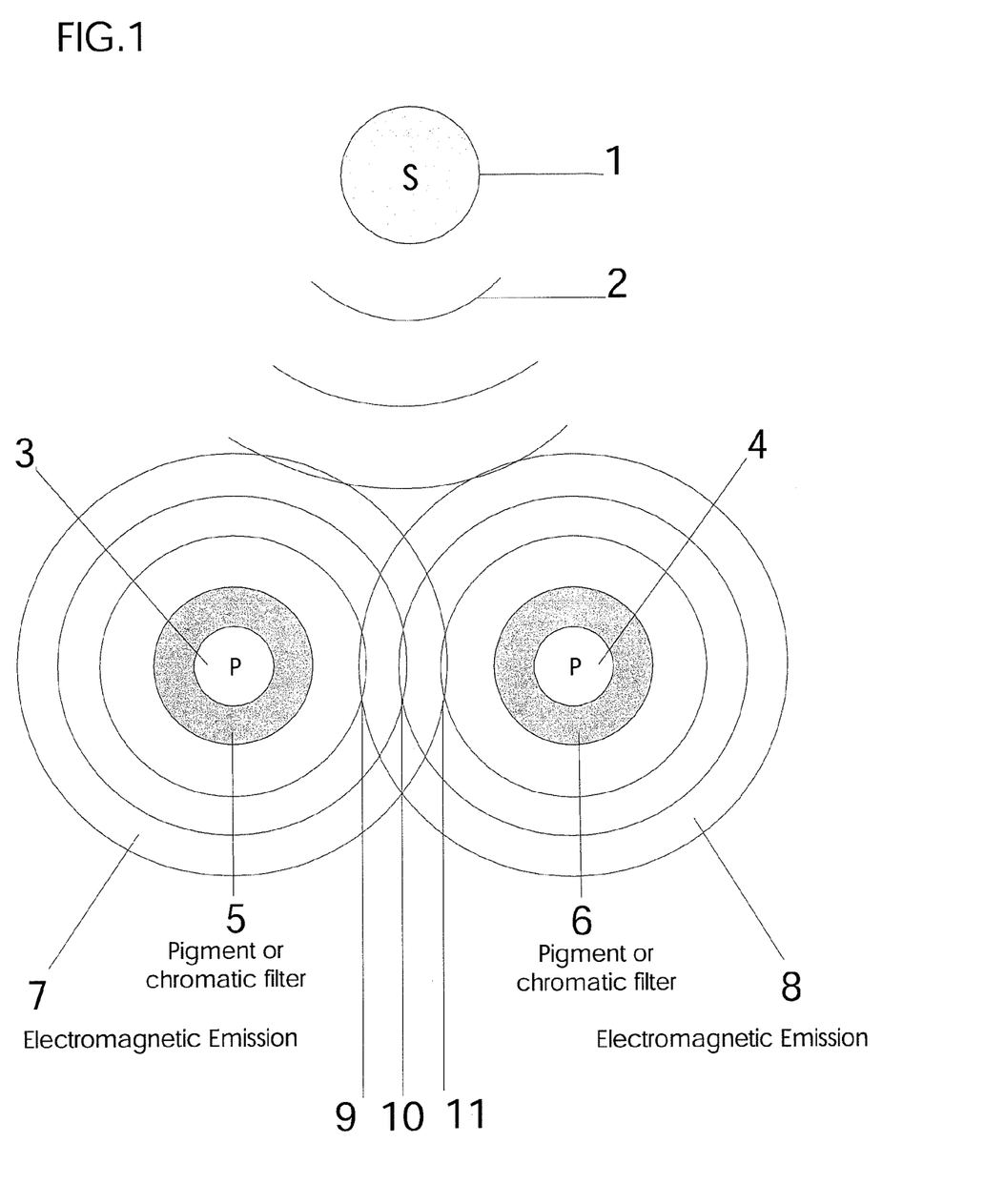

In FIG. 1 shows an elementary example of the intervening principles involved in the development of the invention. The figure shows a simple interference pattern created by solely two sources, while in the real application there is a very large number of intervening sources formed by the reflecting particles.

Starting form a source of electromagnetic energy S (1) a dynamic electromagnetic wave is emitted (2) that bombards (interacts exchanging subatomic particles) another two particles P (3) and (4), both covered by pigment concentrations (5) and (6) that work as chromatic filters, modifying the wavelength received by each one. In these conditions each particle absorbs a certain amount of energy (photons) and at the same time emits another certain quantity of it during the process of particles exchange.

To the effects of the invention we will focus exclusively on the behavior of the photons EMITTED by the particles, regardless of the concept of absorbance. In this sense, each particle becomes a new SOURCE (S), each one projecting its own electromagnetic radiation (7) and (8) to several points in space, with its own wavelength, amplitude and phase. The zone interaction with the other sources creates Interference Patterns characterized by the current conditions at the time of the interaction: distance between sources, wavelength of the sources, etc. In this way creating a complex "map" of the nodal and ventral surfaces giving place to the constructive and destructive interferences. In this way, each point in the space of the undulating motion presents a distinct amplitude. If we arbitrarily choose any point in the space within an information block (SAMPLING POINT) (9, 10 or 11), at this point, the amplitude given by $A=\sqrt{A_1^2+A_2^2+2 \cdot A_1 \cdot A_2 \cos\delta}$ is determined by variables such as: the distance from the Sample Point to each source, the distance between the sources, and the wavelength emitted by each one. This means, that the field shows at each point particular characteristics that are the attribute (Identity) of the field itself at the point scanned, under the particular conditions of interference between the various sources (which are the photon emitting particles).

Figure 2:
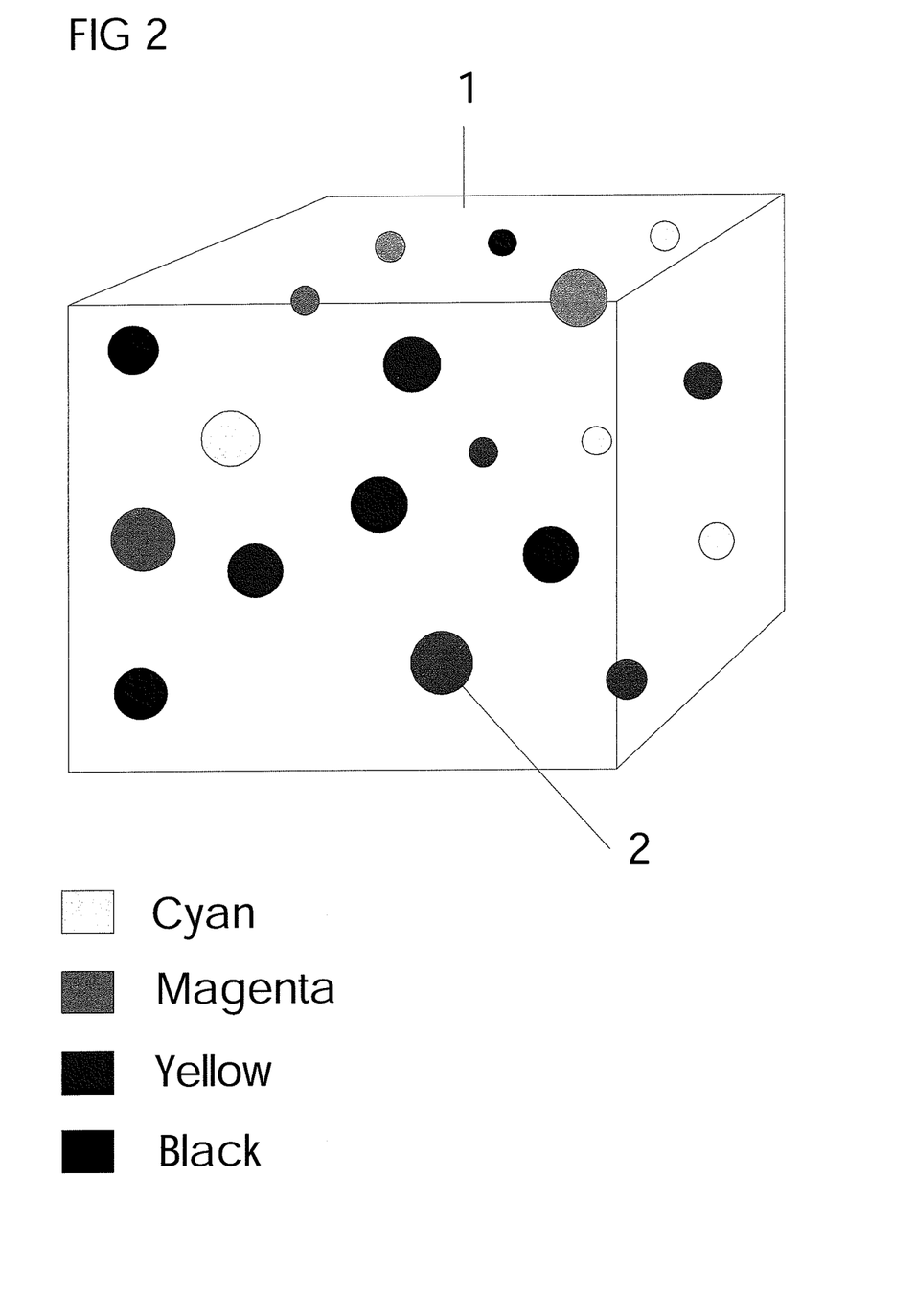

In FIG. 2, the scenario (interference patterns) shown in FIG. 1 can be taken to a higher level of complexity by increasing the sample, this is, adding a larger number of emitting/reflecting particles as shown in FIG. 2, where we observe a 3D structure (data block) (1) integrated by several pigmented particles (for example using the CMYK printing system—Cyan, Magenta, Yellow, Black) (2). The location of the pigmented particles in space is controlled through the separation of the printing points and/or their concentration per inch, which is given by the DPI (dots per inch) and the overlapping that results from the use of multilayer printing, which enhances the phenomenon.

Figure 3:
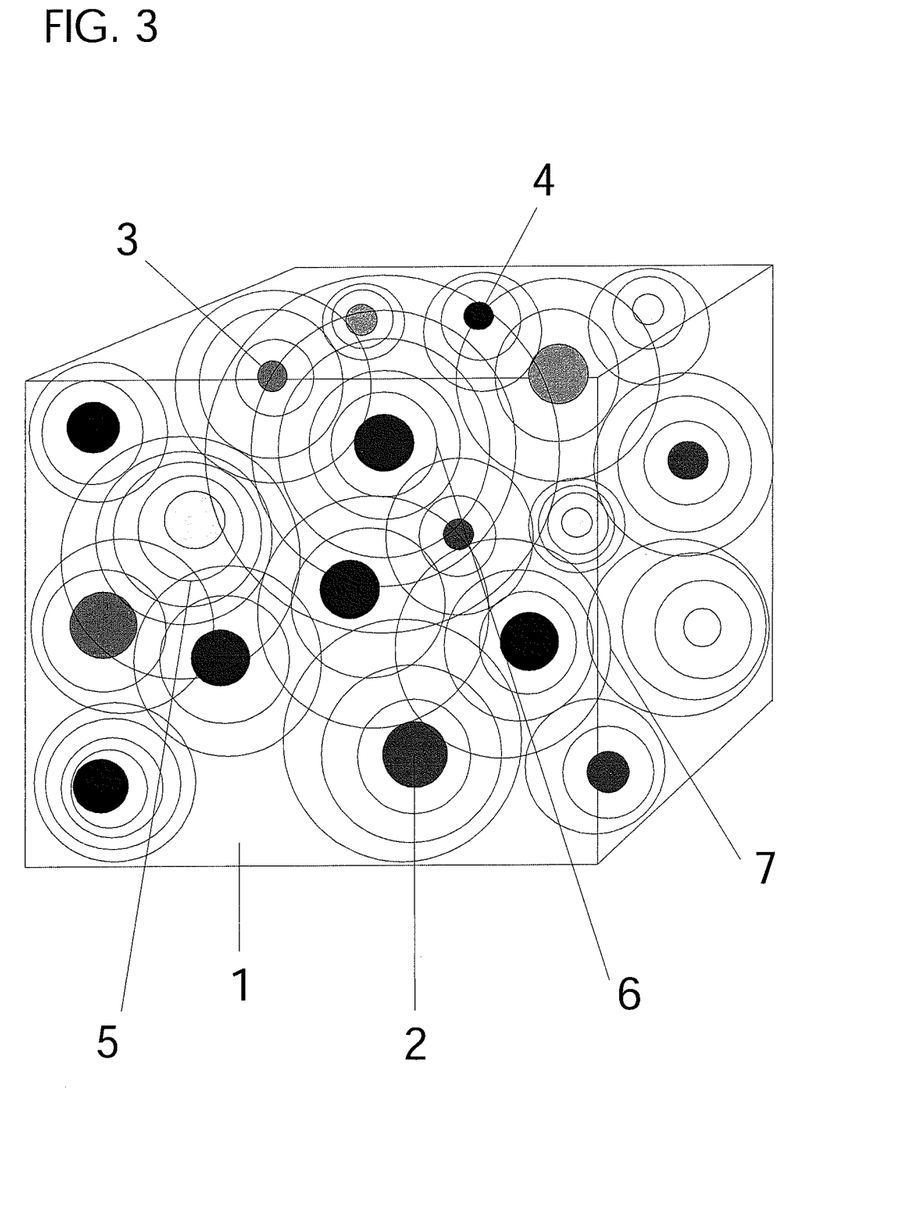

Complex interference patterns (shown in FIG. 3, details 5, 6 and 7) are created by the interaction of several reflecting sources (2, 3, 4, etc) within an information module (1). As a whole, this module (or block) may constitute a single Bit of information. If the conditions of the field shows IDENTITY (wavelength, amplitude and phase match) with respect to the Comparison Matrix in all the scanned points, then a single BIT is accepted or validated at the output.

Figure 4:
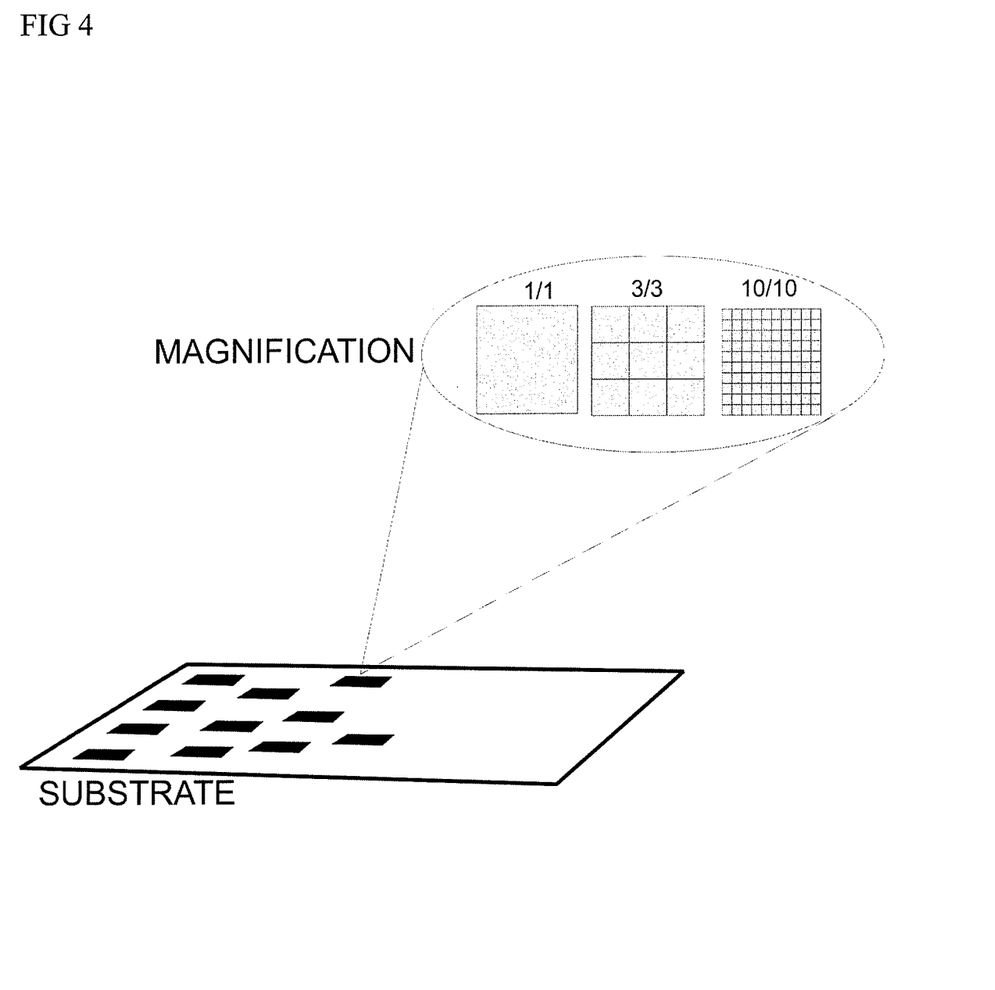

The combination of the various Identity Modules in a single card or support (as seen in FIG. 4) gives place to the creation of, for example, alphanumeric codes, where each Bit in itself relates to a very complex Identity Matrix that protects the information against copying or duplicating attempts.

The scanning of the information can be conducted using different approaches. FIG. 5 shows an arrangement with a light emitting source (1) which can operate in different ranges within the electromagnetic spectrum, propagating the photonic emission (2) on a printing support or subtract (3) where pigmented (with a CMYK pattern) particles have been applied with certain distance parameters (4). The disturbances in the field are "projected" on a screen (5). As an analogy, we could consider a transparent recipient containing quiet water were we produced waves on the surface by dropping something at predefined points, and we located a source of light above the recipient, producing shadows on a screen below. The shadows reproduce the patterns created on the surface of the recipient. These patterns are captured by the screen below, where a grid can be used to graph the interference locations in the system (3). In the framework of the invention, these "electric shadows" relate to the disturbances into the electromagnetic field present at the level of the screen (5) that can be read by means of an array of phototransistors, by "sweeping" the first field by going through it with a second field and reading its distortions. Another method consists of making a beam converge to or go through each of the selected sample points, and reading its response, modifying its own information accordingly to the characteristics of the sample point. The methods described above are meant to establish the conditions (disturbances) at the chosen SAMPLING POINTS (6, 7, 8 and 9), which is to say, the Wave Functions at these points.

What is claimed is:

1. A method for identifying counterfeit documents and articles applied to identification of a support, which comprises subjecting a medium, on or in which selectively pigmented particle deposits have been selectively arranged according to a pre-established distribution and concentration model forming physically inhomogeneous and relatively translucent structures when exposed to radiation in a portion of the electro magnetic spectrum designed ad hoc to produce specific paths for wave transmission in order to produce interference patterns and disturbances in the inner space defined by each deposit, to electromagnetic radiation supplied by one or more emitting sources whereby said radiation is passed through said structures wherein the pigmented particles, acting as optical filters modulate the original wavelengths received while reflecting part of the wave so as to generate interference patterns by emitting photons at new and different wavelengths, in this way integrating a complex undulatory system, wherein selected points are taken for measurement as well as the overall output signal format, and are compared to master patterns in a reference matrix for establishing identity against parameters of wavelength, amplitude and phase that have previously been defined for these chosen interference points, giving place to the corresponding output states: 1 or 0, according to match conditions which allows for the creation of a binary code, when taking into account more than one data structure so constructed and applied on the support embodiment or simply validating or rejecting one single structure for not complying with the validity conditions so that validation is effected only if parameters at said selected points throughout the bombarding process match parameters stored in the master patterns.

2. A method according to claim 1 wherein said comparison is effected by collecting data from transducers or photoelectric cells located to receive radiation that has passed through the article containing the selectively pigmented particle deposits and by software means comparing results obtained with those obtained from an authentic sample.

3. A method according to claim 1 wherein the selectively pigmented particle deposits have been printed on the article.

4. A method according to claim 1 wherein said particle deposits are effected using clusters of particles.

5. A method as claimed in claim 4 wherein the concentration of the particles is selected to create a particular form of interference pattern from radiation passing through the article.

6. A method as claimed in claim 1 wherein the electromagnetic radiation is light.

7. A method as claimed in claim 1 wherein the electromagnetic radiation is in a radio frequency range.

8. A method as claimed in claim 1 wherein the selectively pigmented particles effect changes in a wave form of electromagnetic radiation impinging upon them in addition to contributing to an interference pattern.

9. A card or support to be read and decoded according to the method of claim 1, comprising a layer of material codified by an assignation by printing or any other procedure of concentrations and distribution of pigmented particles, arranged and organized with reference to a matrix of undulatory behavior when exposed to an electromagnetic field, and generating light wave interference patterns as a characteristic of identity.

10. A card or support according to claim 9, comprising two or more layers codified by an assignation according to claim 9.

11. A card or support according to claim 9, having an information layer covered by one or more opaque protective layers.

12. A card or support according to claim 9 having an information layer covered by one or more transparent protective layers.

13. A card or support according to claim 9 made of paper.

14. A card or support according to claim 9 made of cardboard.

15. A card or support according to claim 9 made of plastic.

16. A card or support according to claim 9 made of acetate.

17. A card or support according to claim 9 made of rubber.

18. A card or support according to claim 9 made of Plexiglas.

19. A card or support according to claim 9 made of glass.

20. A card or support according to claim 9 made of adhesive tape.

* * * * *